May 24, 1932.   R. G. ANDERSON   1,859,907

METHOD FOR EMBOSSING PLASTIC MATERIAL

Filed Oct. 18, 1927

INVENTOR
Roland G. Anderson
BY
ATTORNEY

Patented May 24, 1932

1,859,907

UNITED STATES PATENT OFFICE

ROLAND G. ANDERSON, OF NEW HAVEN, CONNECTICUT, ASSIGNOR, BY MESNE ASSIGNMENTS, TO THE GOODYEAR'S INDIA RUBBER GLOVE MANUFACTURING COMPANY, OF NAUGATUCK, CONNECTICUT, A CORPORATION OF CONNECTICUT

METHOD FOR EMBOSSING PLASTIC MATERIAL

Application filed October 18, 1927. Serial No. 227,000.

This invention relates to the formation of raised designs upon plastic material and more particularly to an improved female embossing die for use on unvulcanized rubber and the method of using the same.

Heretofore in impression marking unvulcanized rubber with indicia such as trade marks, sizes, etc., a common practice has been to use an ordinary stamp which forms a recessed mark in the stock. An objection to this is that the mark tends to fill up, by reason of return flow of the rubber, and in the case of varnished articles the varnish also assists in filling up the recess. It has also been proposed to form an embossed mark by the use of cooperating male and female dies on opposite sides of the rubber stock, but owing to the elastic nature of the material it does not flow sufficiently if light pressure is used, resulting in a blurred and poor mark. If a heavy pressure is used the rubber tends to squeeze out from between the dies with resultant thinning and weakening of the stock over the area of the impression. Moreover there is a recess on one side of the stock corresponding to each embossed or raised portion on the opposite side. When such an embossed piece of stock is plied up in making an article air is entrapped in the recesses, and in the subsequent vulcanizing operation blisters form at these points and the articles are ruined or must be sold as seconds.

It is an object of this invention to emboss unvulcanized rubber without leaving the imprint of the edges of the face of the die in the rubber. It is a further object to form characters such as figures and letters projecting from the rubber which shall project outwardly to a considerable extent and be sharply defined. It is a further object to provide an embossing die which when used in embossing rubber will leave an emblem projecting from the rubber over its entire area and not merely in outline. Other objects will be apparent from the specification and from the accompanying drawings in which latter:

Figure 1:
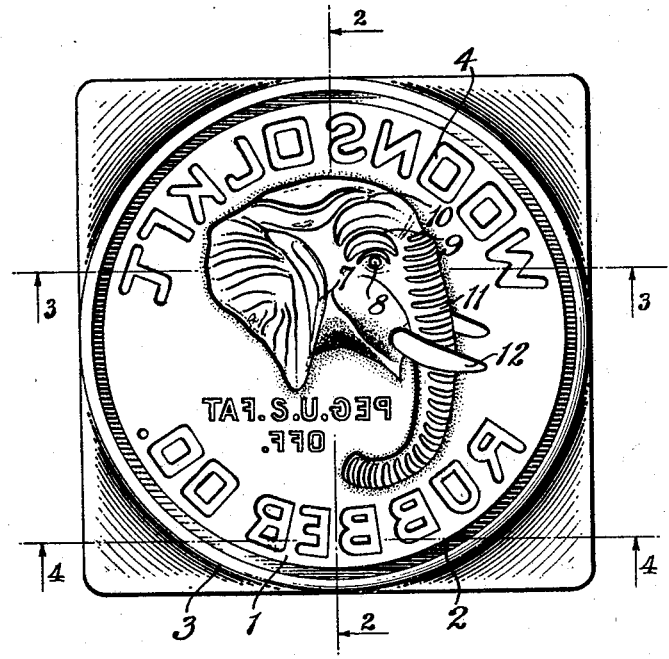
Fig. 1 is a plan view of the die.
Figure 2:
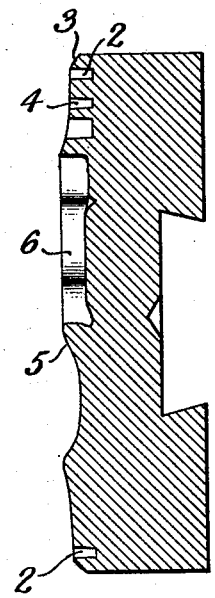
Fig. 2 is a side section of the die along the line 2—2 of Fig. 1.
Figure 3:
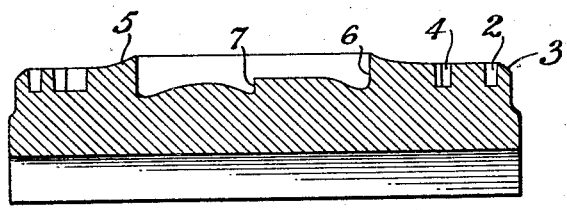
Fig. 3 is a front section of the die along the line 3—3 of Fig. 1.
Figure 4:
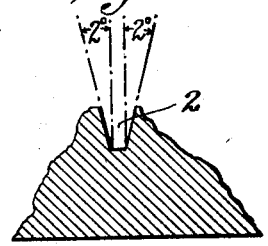
Fig. 4 is a fragmentary section along the line 4—4 of Fig. 1.

Referring particularly to the drawings, the die comprises a body portion provided with an embossing face 1 in which there is provided a continuous recess 2 which extends around the face in spaced relation to the edges thereof. The face is progressively inset from the outer edge of the recess 2 to the edge of the face as indicated at 3. Recesses 4 in the shape of characters such as figures or letters are formed in the embossing face of the die and the portion of the face bearing these characters is made substantially flat, as is clearly shown in Figs. 2 and 3. The recesses 2 and 4 are preferably formed at least twice as deep as their width at any portion thereof and the walls of the recesses are formed almost perpendicular to the surface, preferably inclined approximately 2° outwardly from perpendicular. When the walls are inclined substantially less than 2° the rubber will not readily strip from the die, while when the angle is made appreciably larger the embossed portions are not sharply defined. When emblems of considerable area are to be formed in the embossing die the portion of the face of the die surrounding the emblem is projected outwardly from the die as is shown at 5 forming a raised extension projecting from the face of the die with a concave curvature. Into the projecting portion of the face there is cut the recess 6, the walls of which extend in the outlines of the emblem to be formed, as for example an elephant's head as illustrated in the drawings. The recess is cut deeply into the face of the die to a depth sufficient to provide the desired height to the embossing, and the outer walls of the recess are slightly inclined outwardly from the perpendicular, the precise angle depending somewhat on the size and shape of the embossed portion to be formed.

The base of the recess 6 is made generally convex in shape with the deepest portion of the recess in general lying at the base of the walls thereof. Designs within the emblem are effected by forming recesses within the base of the recess 6, for example in forming the ear of the elephant's head a wall 7 is formed which extends deeply into the base of the recess 6 leaving the intermediate portion of the base between the wall 7 and the wall of the recess in a generally convex shape. By virtue of this construction when the die is pressed against a sheet of rubber the rubber will tend to flow sharply into the recesses at the base of these walls making the outlines of the area particularly sharply defined in the rubber. Similarly other features of the die such as the eye 8, the wrinkles 9, 10 and 11, and the tusks 12 are formed by providing recesses in the die at the desired locations. As a consequence when embossing with this die the prominent convex portions of the die adjacent the eye, tusks and wrinkles tend to force the rubber sharply into the recesses leaving portions of rubber constituting these parts projecting sharply from the surrounding rubber.

In utilizing the die for embossing sheets of rubber stock of a thickness approximately $\frac{1}{16}''-\frac{3}{8}''$ or greater, the die is pressed against the surface of the sheet, preferably with a yielding pressure of approximately 500 lbs. in two separate impulses. The die cooperates with a backing or support for the rubber of unbroken outline, no male die being used. By the use of a yielding pressure a good impression can be obtained on stocks varying considerably in thickness without the necessity of positively adjusting the stroke of the die. When first applied the die sinks into the rubber and the rubber flows laterally from the portion opposite the solid portion of the die and into the recesses of the die with considerable velocity sufficient to force the rubber far beyond the limit of its natural stretch and sufficient to cause the rubber to become expanded by its own inertia. After the first impulse the movement of the die is momentarily slowed down or halted, and it then continues to the end of its stroke. The entire operation is very rapid, occupying only about one half a second, and during the first impulse the flow of rubber into the recesses tends to lag. The momentary halt permits the rubber to flow into the recesses to the proper extent, and the final impulse substantially fixes or sets the rubber in its embossed position. Due to the elasticity of the rubber, however, it tends to recede slightly from its highest position when the pressure on the die is relieved, but by reason of the deep embossing recesses it has flowed into the recesses sufficiently far so that upon settling back to assume its final set condition, it will still extend deeply into the die. The die tends to break down the grain structure of the rubber and due to the sharpness of the angle at which the recesses are cut the outlines of the projecting portions of the rubber are sharply defined. As the die passes into the rubber the portion thereof bearing the emblem of enlarged area first embosses the rubber, causing the prominent part of the design to stand out clearly in sharp outlines from the face of the sheet of rubber. The outer recess 2 not only in effect forms an embossed outline or frame for the main emblem but it also tends to prevent flow of rubber to the outside of the die outline. The pressure of the die adjacent the characters irons out the surrounding rubber so that the characters project outwardly prominently.

It is obvious that the above characteristics hold good when the embossing recesses are of other shapes than in the specific embodiment shown.

Having thus described my invention, what I claim and desire to protect by Letters Patent is:

1. The method of embossing unvulcanized rubber which comprises subjecting the rubber to a rapid and yielding heavy pressure in successive impulses between a female die and an unbroken supporting surface.

2. The method of embossing unvulcanized rubber which comprises subjecting the rubber to a yielding pressure of substantially 500 lbs. in successive impulses between a female die and an unbroken supporting surface.

Signed at New Haven, county of New Haven, State of Connecticut, this 12th day of October, 1927.

ROLAND G. ANDERSON.